3,150,018
SOLID PROPELLANT COMPOSITIONS CONTAINING UNSATURATED POLYESTER RESIN

George W. Batchelder, Glendora, and Gilbert A. Zimmerman, Monrovia, Calif., assignors to Aerojet-General Corporation, Azusa, Calif., a corporation of Ohio
No Drawing. Filed May 17, 1954, Ser. No. 430,462
4 Claims. (Cl. 149—19)

This invention relates to new burning rate catalysts for solid propellant compositions.

Propellant compositions in use at the present time are composed essentially of two main components, namely, a resin fuel and an oxidizing material. The fuel component is generally an organic polymer such as an alkyd resin. Due to the smokeless manner in which they burn, ammonium salts such as the nitrates, perchlorates and chlorates are preferred as oxidizers.

The desirability of a rapid burning rate propellant for such purposes as rocket and ordnance projection has long been appreciated in propellant manufacture. Heretofore, however, only moderate burning rates have been obtained from propellants oxidized with ammonium salts. For example, ammonium nitrate oxidized propellants having burning rates in excess of 0.10 in. sec.$^{-1}$ have not been obtained even though burning rate acceleration catalysts such as ammonium dichromate are employed.

We have now found that mixtures of potassium nitrite and sodium sulfate or sodium thiosulfate in amounts of only 2% by weight of the composition increase the burning rate of propellants oxidized with ammonium salts as much as threefold. These catalytic mixtures are especially valuable when employed in combination with conventional burning rate catalysts such as ammonium dichromate, however, their use is not limited to this particular embodiment of the invention.

These burning rate catalysts are particularly useful although not necessarily limited in their use in propellant compositions utilizing an alkyd resin type fuel. Such compositions are ordinarily composed of three principal ingredients, namely, an alkyd resin, an olefinic monomer and an inorganic oxidizing salt.

The alkyd resin is usually a polyester prepared by the condensation of a polycarboxylic acid with a polyhydric alcohol, one or both of which contain olefinic linkages. The unsaturation present in the ester is necessary to permit cross linking with the olefinic monomer. Among the unsaturated polycarboxylic acids which are ordinarily used in the preparation of such polyesters are maleic, fumaric, citraconic, mesaconic, itaconic acid, etc. Saturated acids found to be useful are such acids as oxalic, malonic, succinic and glutaric, etc. The polyhydric alcohols useful are dihydric alcohols such as ethylene glycol, propylene glycol, glycol, etc.; as well as trihydric alcohols such as glycerol; tetrahydric alcohols such as the erythritols; pentahydric alcohols such as arabitol, etc., or mixtures of any of these alcohols.

The olefinic component of the fuel may be, for example, styrene, vinyl acetate, acrylic acid esters, methacrylic acid esters, allyl compounds such as allyl diglycol carbonate, diallyl maleate, diallyl glycollate, and other unsaturated components such as propylene, butadiene, as well as the acetylenes. In addition, derivatives of any of the above substances which are capable of polymerization with the resin may also be used. In general, any unsaturated compound compatible with the resin, and which will polymerize with it, is suitable; this includes all unsubstituted olefins and, in addition, many substituted olefins. The unsaturation present in the polyester permits it to polymerize with the double bond in the olefin, thus forming cross linkages. When a sufficient amount of cross linkage occurs the resin becomes thermosetting; with a lesser degree of cross linkage, the resin may be thermoplastic; and, in some cases, the resin possesses properties of both thermoplastic and thermosetting resins. All of these types are within the purview of the present invention.

The oxidizers useful for this invention are the ammonium chlorate, perchlorate and nitrate salts. The oxidizer is usually present in a finely divided condition dispersed throughout the fuel in amounts of about 50% to about 80% by weight of the total composition. Optimum results are obtained when there is sufficient oxygen in the propellant to oxidize all of the carbon to carbon monoxide and ⅓ of the hydrogen to water. The burning rate acceleration catalyst is usually present in amounts of from about 0.5% to about 5%.

The propellant grains are prepared by blending together the polyester and olefinic components of the fuel, the oxidizer and the burning rate catalyst. If desired, a suitable polymerization catalyst may also be added. The mixture is cast into a mold and the fuel allowed to polymerize at a temperature in the range of from about 25° C. to about 100° C., and preferably at a temperature below 60° C.

The polymerization catalysts usually employed are organic peroxides such as benzoyl peroxide, lauryl peroxide, acetobenzoyl peroxide, ditertiary butyl peroxide, methyl ethyl ketone peroxide, 1-hydroxy-cyclohexyl hydroperoxide, cumene hydroperoxide, cyclo-alkane hydrocarbon peroxide, and peresters such as tertiary butyl perbenzoate and diperphthalate.

Various ingredients may also be added for specific purposes without departing from the scope of the invention. For example, lecithin may be added to improve the castability of the uncured propellant. t-Butyl catechol or cobalt octanoate are often added as a polymerization modifier.

The propellant grains prepared in the above deescribed manner can withstand rough handling and will perform satisfactorily at temperatures in the range of from about —65° to about 165° F.

To illustrate the effect of potassium nitrite mixtures with sodium sulfate or sodium thiosulfate upon the burning rate of solid propellants and thereby more clearly explaining the invention, a propellant was prepared having the following formulation:

| Component: | Propellant I, wt. percent |
|---|---|
| Ammonium dichromate | 1.99 |
| Ammonium nitrate | 72.79 |
| Polyester, by wt. percent | 9.79 |
|     43.00% diethylene glycol | |
|     44.25% adipic acid | |
|     1.75% maleic anhydride | |
| Styrene | 2.66 |
| Methyl acrylate | 12.22 |
| Methyl amyl ketone peroxide | 0.49 |
| Cobalt octoate and lecithin | 0.06 |
| | 100.00 |

As a matter of convenience in establishing a suitable burning rate standard, ammonium dichromate was incorporated in the propellants used for illustration.

The burning rates effected by the addition of the catalysts of this invention are set forth in Table I. It is to be understood, however, that these examples are presented merely as a means of illustration and are not intended to limit the scope of the invention in any way.

Table I

| Catalyst | Percent by wt. of catalyst added | Burning Rate, in. sec.$^{-1}$ 1,000 p.s.i. |
|---|---|---|
| None—Control | | 0.07 |
| Potassium Nitrite | 1 | 0.20 |
| Sodium Sulfate | 1 | |
| Potassium Nitrite | 1 | 0.20 |
| Sodium Thiosulfate | 1 | |

For comparative purposes the burning rates induced by the components of the above catalysts when used alone are shown below in Table II.

Table II

| Catalyst | Percent by wt. of catalyst added | Burning Rate, in. sec.$^{-1}$ 1,000 p.s.i. |
|---|---|---|
| Control | | 0.07 |
| Potassium Nitrite | 1 | 0.16 |
| Sodium Thiosulfate | 1 | 0.05 |

It is obvious that the excellence of the catalysts of this invention is not due merely to the additive values of their components but is a unique result of their combination.

The use of mixtures of potassium nitrite and sodium sulfate, and potassium nitrite and sodium thiosulfate catalysts is not limited by the particular fuel components contained in the propellants. Polymers of the polynitro alkenes, nitro-containing acids and nitro-containing esters, as well as the readily combustible polymeric materials, may be used without departing from the scope of this invention.

Due to the great increase in the burning rates induced by the catalysts of this invention it is apparent that these catalysts will find widespread application in the manufacture of solid propellants.

We claim:
1. A solid propellant composition consisting essentially of a cured, intimate mixture of from about 50% to about 80% by weight of the total propellant composition of an ammonium salt selected from the group consisting of ammonium chlorate, perchlorate and nitrate and an unsaturated polyester resin consisting of the condensation product of a saturated polyhydric alcohol and polycarboxylic acid heteropolymerized with an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate, and mixtures thereof; and from about 0.5% to about 5% by weight of a burning rate acceleration catalyst comprising a mixture of about equal amounts potassium nitrite and a sodium salt selected from the group consisting of sodium sulfate and sodium thiosulfate.

2. The solid propellant composition of claim 1 wherein the ammonium salt is ammonium nitrate and the unsaturated polyester resin consists of the condensation product of diethylene glycol, adipic acid and maleic anhydride heteropolymerized with a mixture of styrene and methyl acrylate.

3. The composition of claim 1 wherein the burning rate acceleration catalyst comprises a mixture of about equal amounts potassium nitrite and sodium sulfate.

4. The solid propellant composition of claim 1 wherein the burning rate acceleration catalyst comprises a mixture of about equal amounts potassium nitrite and sodium thiosulfate.

References Cited in the file of this patent

UNITED STATES PATENTS

| 2,388,319 | Fuller | Nov. 6, 1945 |
| 2,434,872 | Taylor et al. | Jan. 20, 1948 |
| 2,472,963 | Singleton et al. | June 14, 1949 |
| 2,479,828 | Geckler | Aug. 23, 1949 |
| 2,498,388 | Ball | Feb. 21, 1950 |
| 2,637,274 | Taylor et al. | May 5, 1953 |

FOREIGN PATENTS

| 579,057 | Great Britain | July 22, 1946 |

OTHER REFERENCES

Hackh's Chemical Dictionary, 3rd Edition, The Blakiston Co., Phila., page 593.